United States Patent
Konchan et al.

(10) Patent No.: US 9,945,162 B2
(45) Date of Patent: Apr. 17, 2018

(54) DOOR ASSEMBLY AND A VEHICLE

(71) Applicant: GM GLOBAL TECHNOLOGY OPERATIONS LLC, Detroit, MI (US)

(72) Inventors: Jeffrey L. Konchan, Romeo, MI (US); Terrence P. Costigan, Fenton, MI (US); Charles R. Quinn, Pleasant Ridge, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/237,803

(22) Filed: Aug. 16, 2016

(65) Prior Publication Data
US 2018/0051496 A1    Feb. 22, 2018

(51) Int. Cl.
| | |
|---|---|
| *E05B 85/06* | (2014.01) |
| *E05B 79/06* | (2014.01) |
| *E05B 77/44* | (2014.01) |
| *E05B 79/04* | (2014.01) |
| *E05B 79/20* | (2014.01) |
| *E05B 79/22* | (2014.01) |
| *E05B 83/36* | (2014.01) |
| *B60J 5/00* | (2006.01) |
| *B60R 1/06* | (2006.01) |

(52) U.S. Cl.
CPC ............... *E05B 85/06* (2013.01); *B60J 5/00* (2013.01); *B60R 1/06* (2013.01); *E05B 77/44* (2013.01); *E05B 79/04* (2013.01); *E05B 79/20* (2013.01); *E05B 79/22* (2013.01); *E05B 83/36* (2013.01)

(58) Field of Classification Search
CPC .......... E05B 85/06; E05B 77/44; E05B 79/04; E05B 79/22; E05B 79/20; E05B 83/36; B60R 1/06; B60J 5/00
USPC ....................................................... 296/152
See application file for complete search history.

(56) References Cited

U.S. PATENT DOCUMENTS

| | | | |
|---|---|---|---|
| 7,712,809 B2* | 5/2010 | Lynam | B60J 5/0404 248/475.1 |
| 7,712,819 B2* | 5/2010 | Ottino | B60R 1/06 296/1.11 |

* cited by examiner

*Primary Examiner* — Joseph D. Pape
*Assistant Examiner* — Dana D Ivey
(74) *Attorney, Agent, or Firm* — Quinn IP Law

(57) ABSTRACT

A vehicle and a door assembly each include an inner panel and an outer panel coupled to each other to define a door. A first handle is attached to the outer panel. A mirror apparatus is supported by the door and spaced apart from the first handle. A lock apparatus is supported by at least one of the door and the mirror apparatus. The lock apparatus is disposed closer to the mirror apparatus than the first handle.

20 Claims, 3 Drawing Sheets

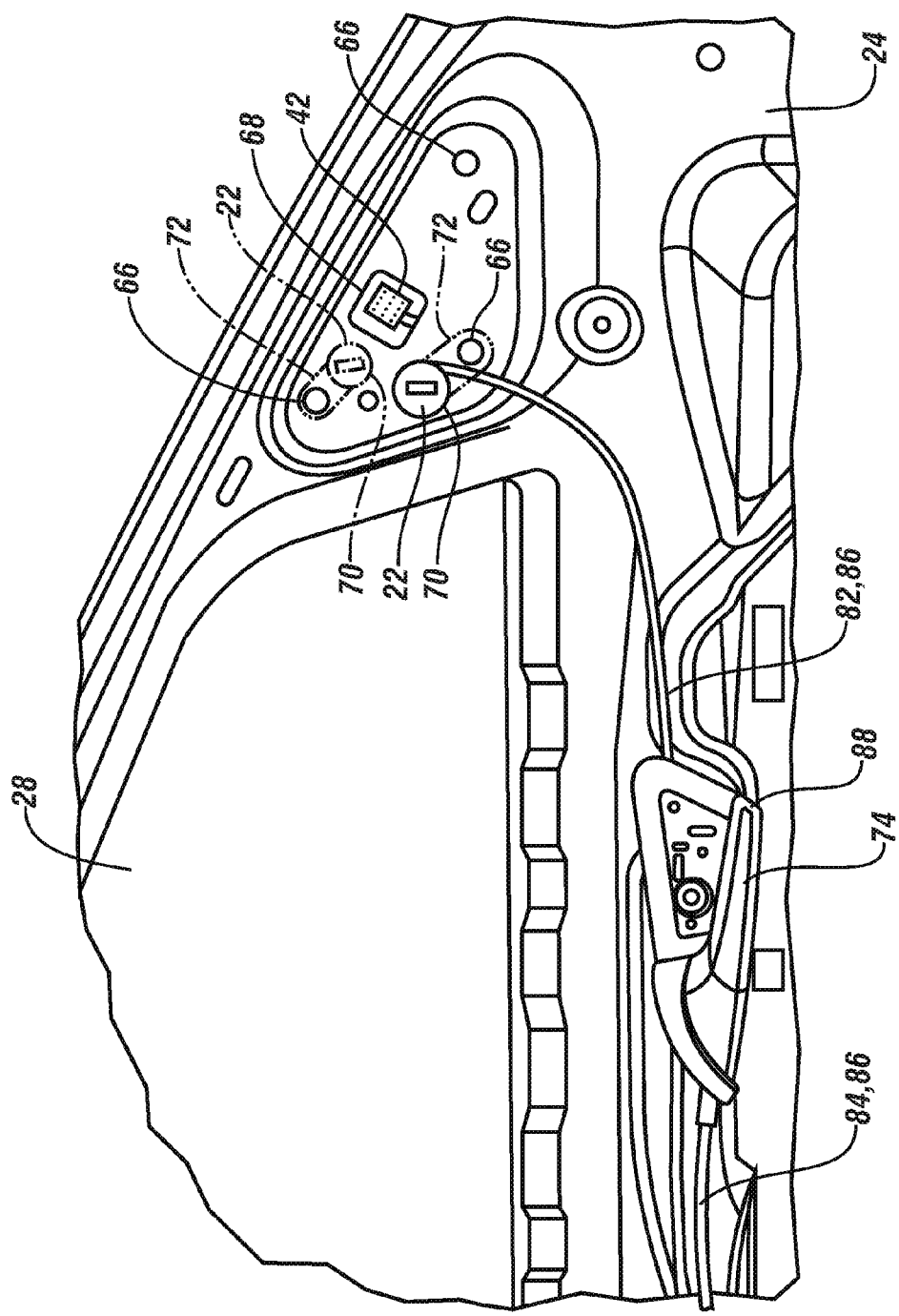

DOOR ASSEMBLY AND A VEHICLE

TECHNICAL FIELD

The present disclosure relates to a door assembly and a vehicle.

BACKGROUND

Many vehicles include a passenger compartment which can be accessible by one or more doors. Therefore, when a passenger desires to enter or exit the passenger compartment, the passenger opens or closes the door to allow ingress or egress. The doors can be opened from the inside by a respective inner door handle, and the doors can be opened from the outside by a respective outer door handle.

Generally, the doors can be locked to prevent entry into the passenger compartment. To unlock the doors from the outside of the vehicle, the front doors can include a lock disposed adjacent to the outer door handle in which a key can be utilized to unlock.

SUMMARY

The present disclosure provides a door assembly including an inner panel and an outer panel coupled to each other to define a door having an outer surface visible from outside of the door. The door assembly also includes a first handle attached to the outer panel and visible from outside of the door. The door assembly further includes a mirror apparatus supported by the door and extending outwardly away from the inner panel such that the mirror apparatus is disposed outside of the door. The mirror apparatus is spaced apart from the first handle. Additionally, the door assembly includes a lock apparatus supported by at least one of the door and the mirror apparatus. The lock apparatus is disposed closer to the mirror apparatus than the first handle.

The present disclosure also provides a vehicle including a body defining a passenger compartment. The vehicle also includes an inner panel and an outer panel coupled to each other to define a door. The door is movable between an open position and a closed position relative to the passenger compartment. The vehicle further includes a first handle attached to the outer panel and is exposed outside of the passenger compartment. Additionally, the vehicle includes a mirror apparatus supported by the door and disposed outside of the passenger compartment. The mirror apparatus is spaced apart from the first handle. Furthermore, the vehicle includes a lock apparatus supported by at least one of the door and the mirror apparatus. The lock apparatus is disposed closer to the mirror apparatus than the first handle.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 4 is a schematic fragmentary side view of the inner panel with the lock cylinder and the electrical wire disposed through different apertures, and different locations of the lock cylinder are illustrated.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
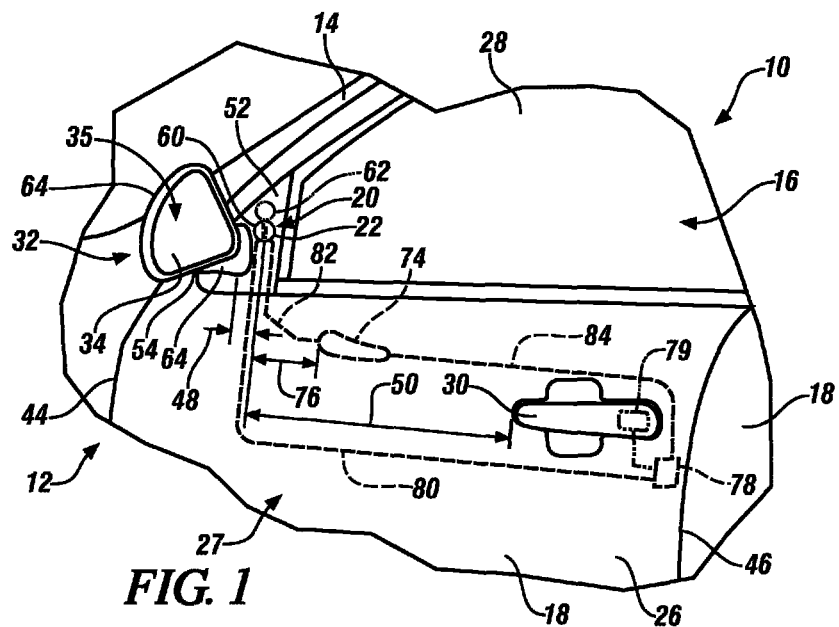
FIG. 1 is a schematic fragmentary perspective view of an outside of a vehicle illustrating a door and a mirror apparatus, with a lock apparatus disposed through a portion of the mirror apparatus.

Referring to the Figures, wherein like numerals indicate like or corresponding parts throughout the several views, a vehicle 10 and a door assembly 12 are generally shown in FIG. 1.

The door assembly 12 can be utilized in a vehicle application or a non-vehicle application. Therefore, the door assembly 12 can be part of the vehicle 10. Non-limiting examples of the vehicles 10 can include cars, trucks, motorcycles, boats, watercrafts, all-terrain vehicles, off-road vehicles, aircrafts, farm equipment or any other suitable vehicle. Non-limiting examples of the non-vehicles can include machines, farm equipment or any other suitable non-vehicle.

In the vehicle application, for example as shown in FIG. 1, the vehicle 10 can include a body 14 defining a passenger compartment 16. Generally, the passenger compartment 16 is accessible by one or more doors 18. Therefore, when a passenger desires to enter or exit the passenger compartment 16, the passenger opens or closes the door 18 to allow ingress or egress. As such, the door(s) 18 are movable between an open position and a closed position relative to the passenger compartment 16. FIG. 1 illustrates the doors 18 in the closed position.

The doors 18 can be opened from the inside by a respective inner door handle, and the doors 18 can be opened from the outside by a respective outer door handle. FIG. 1 illustrates the inner door handle of one door 18 in hidden lines and the outer door handle of the same door 18 in solid lines. The inner and outer door handles can be any suitable configuration, and the Figures are for illustrative purposes only.

Generally, the doors 18 can be locked to prevent entry into the passenger compartment 16. To unlock the doors 18 from the outside of the vehicle 10, one or more of the doors 18 can include a lock apparatus 20 in which a key can be utilized to unlock the lock. Therefore, the lock apparatus 20 provides a way to mechanically open the door 18, without having to electronically unlock the door 18 via a key fob. The lock apparatus 20 can include a lock cylinder 22 which is configured to receive the key to unlock the door 18. The door assembly 12 can include the lock apparatus 20, and the lock apparatus 20 will be discussed further below.

Figure 2:
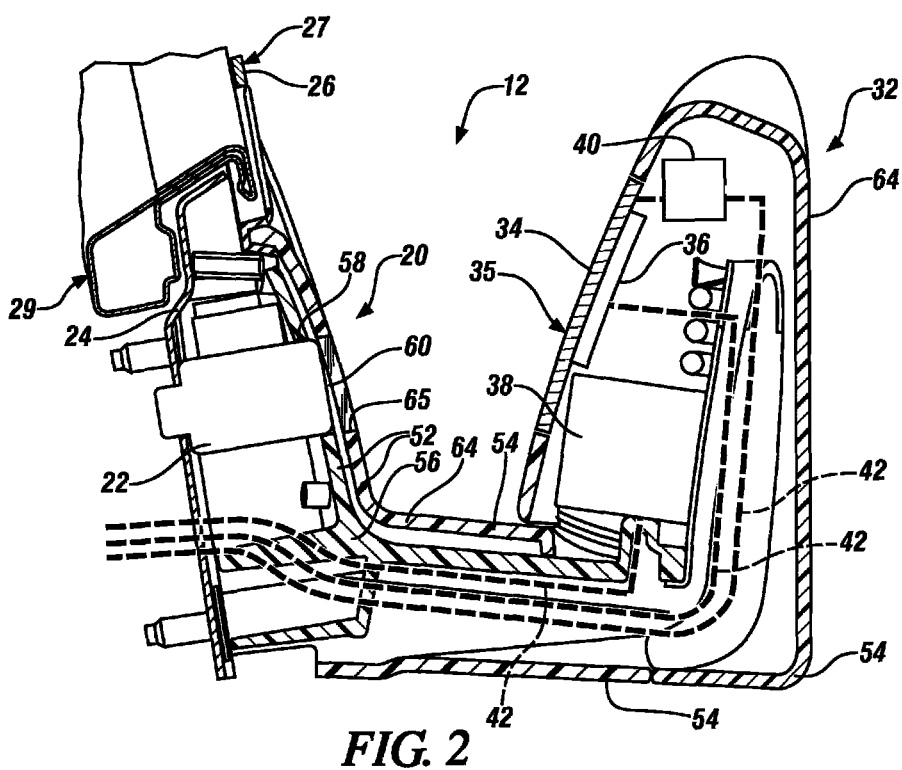
FIG. 2 is a schematic cross-sectional view of the mirror apparatus and a lock cylinder.

Referring to FIG. 2, the vehicle 10 and/or the door assembly 12 include an inner panel 24 and an outer panel 26 coupled to each other to define the door 18. The door 18 has an outer surface 27 visible from the outside of the door 18 and an inner surface 29 visible from inside the door 18. In other words, the outer surface 27 is visible from outside of the passenger compartment 16 and the inner surface 29 is visible from inside the passenger compartment 16. The inner and outer panels 24, 26 can be arranged to define a cavity between the inner and outer panels 24, 26. For example, a window 28 can move relative to the inner and outer panels 24, 26 into and out of the cavity.

Referring back to FIG. 1, the door assembly 12 further includes a first handle 30 attached to the outer panel 26 and visible from outside of the door 18. Therefore, the first handle 30 is visible from outside of the passenger compartment 16. In certain embodiments, the first handle 30 is selectively movable relative to the outer surface 27 to open the door 18. In other embodiments, the first handle 30 is not movable relative to the outer surface 27, i.e., remains stationary relative to the outer surface 27, to open the door 18. Regardless of whether the first handle 30 is movable relative to the outer surface 27, the first handle 30 can be utilized to move the door 18 to the open position. Simply stated, the first handle 30 is utilized to open the door 18 from outside of the passenger compartment 16. As such, the first handle 30 is exposed outside of the vehicle 10. The first handle 30 can also be referred to as the outer door handle as discussed above.

Continuing with FIG. 1, the door assembly 12 also includes a mirror apparatus 32 supported by the door 18. The mirror apparatus 32 extends outwardly away from the inner panel 24. As such, the mirror apparatus 32 is disposed outside of the door 18, and more specifically, outside of the passenger compartment 16. Therefore, the mirror apparatus 32 is visible from outside of the passenger compartment 16. Generally, the mirror apparatus 32 is spaced apart from the first handle 30.

Again, continuing with FIG. 1, the mirror apparatus 32 can include a mirror 34. Generally, the mirror 34 reflects images. For example, the mirror 34 can reflect images that a driver of the vehicle 10 can utilize to see images around the vehicle 10. Therefore, the mirror 34 can include a reflective surface 35.

Referring to FIG. 2, the mirror apparatus 32 can include one or more of a heating element 36, a motor 38, a visual indicator 40, etc. The heating element 36 can be electrically connected to the mirror 34 to heat the mirror 34 to remove various debris, such as snow, frost, moisture, etc. Turning to the motor 38, the motor 38 can be utilized to move the mirror 34. For example, the motor 38 can tilt, e.g., up, down, side to side, etc., the mirror 34 such that the driver can see the desired area around the vehicle 10, and/or the motor 38 can rotate the mirror 34 to selectively face the passenger compartment 16. It is to be appreciated that one motor 38 can be utilized to tilt the mirror 34 and rotate the mirror 34, or alternatively, one motor 38 can tilt the mirror 34 and another motor 38 can rotate the mirror 34. Regarding the visual indicator(s) 40, one visual indicator 40 can be a blinker, and another visual indicator 40 can be a blind spot indicator. The heating element 36, the motor 38 and the visual indicator 40 are schematically shown for illustrative purposes only.

Continuing with FIG. 2, an electrical wire 42 can be electrically connected to the mirror apparatus 32. Therefore, the mirror apparatus 32 can include the electrical wire 42. One or more electrical wires 42 can be utilized depending on the features incorporated with the mirror apparatus 32. For example, if utilizing the heating element 36, the motor 38 and the visual indicator 40, each of these components can include a respective electrical wire 42 as shown in FIG. 2.

Again, continuing with FIG. 2, the lock apparatus 20 is supported by at least one of the door 18 and the mirror apparatus 32. The phrase "at least one of" as used herein should be construed to include the non-exclusive logical "or", i.e., A and/or B and so on depending on the number of components. Therefore, for example, the lock apparatus 20 can be supported by the door 18 or the mirror apparatus 32, or alternatively, the lock apparatus 20 can be supported by both the door 18 and the mirror apparatus 32.

As shown in FIG. 1, the lock apparatus 20 is disposed closer to the mirror apparatus 32 than the first handle 30. More specifically, the lock cylinder 22 is disposed closer to the mirror apparatus 32 than the first handle 30. Specifically, the lock cylinder 22 is disposed closer to the mirror 34 than the first handle 30. In one embodiment, the lock apparatus 20 is disposed through a portion of the mirror apparatus 32 and is spaced from the outer panel 26. Therefore, the lock apparatus 20 is not disposed through the outer panel 26.

As such, the outer panel 26 can be designed without having to accommodate the lock apparatus 20. Furthermore, the first handle 30, i.e., the outer door handle, can benefit by moving the lock apparatus 20 away from the first handle 30. For example, by removing the lock apparatus 20 from the outer panel 26, the outer surface 27 of the door 18 and/or the first handle 30 can be more aesthetically pleasing, and the mass/size of the outer panel 26 and/or the first handle 30 can be minimized. Furthermore, more options for packaging the window 28 relative to the cavity can be provided since the lock apparatus 20 is not taking up any room in the cavity. Additionally, the outer panel 26 does not have to be designed to prevent tampering of the lock apparatus 20, thus, the thickness of the outer panel 26 can be reduced. In addition, by removing the lock apparatus 20 from the outer panel 26, a force to the outer panel 26 cannot inadvertently cause the door 18 to unlock.

Continuing with FIG. 1, the door 18 includes a first end 44 and a second end 46 opposing each other relative to a length of the door 18. The first end 44 is disposed proximal to a first compartment and the second end 46 disposed proximal to a back door 18 or rear passenger door 18. If there are not back doors 18, i.e., there are only front doors 18, then the second end 46 of the door 18 can be disposed proximal to a second compartment. Depending on the type of vehicle 10, as one non-limiting example, the first compartment can be an engine compartment and the second compartment can be a storage compartment.

The lock apparatus 20 is disposed relative to the other components axially relative to the length of the door 18. Therefore, the lock apparatus 20 is spaced a first distance 48 from the mirror 34 axially relative to the length. Furthermore, the lock apparatus 20 is spaced a second distance 50 from the first handle 30 axially relative to the length. As shown in FIG. 1, the first distance 48 is less than the second distance 50.

Referring to FIG. 1, the mirror apparatus 32 can include a base structure 52 and a flange structure 54 extending outwardly from the base structure 52. Therefore, the flange structure 54 is spaced from the vehicle 10. The mirror 34 can be disposed in the flange structure 54 and the lock apparatus 20 can be incorporated into the base structure 52. The base structure 52 can cooperate with the outer surface 27 of the door 18 such that there is a natural progression from one to the other for aesthetic purposes of the door 18. The base structure 52 is stronger than the outer panel 26, so incorporating the lock apparatus 20 in the base structure 52 prevents tampering of the lock apparatus 20. Furthermore, the base structure 52 is configured to provide packaging space for the lock apparatus 20.

Referring to FIG. 2, the mirror apparatus 32 can also include a first bracket 56 mounted to the inner panel 24.

Therefore, the first bracket 56 can be supported by the door 18. The first bracket 56 extends outwardly away from the inner panel 24. Generally, the mirror 34 is supported by the first bracket 56, and the lock cylinder 22 is disposed through the first bracket 56. More specifically, the first bracket 56 can define an opening 58, with the lock cylinder 22 disposed through the opening 58.

The first bracket 56 is stronger than the outer panel 26 which prevents tampering of the lock apparatus 20. For example, the first bracket 56 can be formed of a material stronger than the outer panel 26, thus increasing strength around the lock apparatus 20. As another example, the first bracket 56 can be thicker than the outer panel 26, thus increasing strength around the lock apparatus 20. The first bracket 56 can be formed with one or more ribs, one or more plates, one or more flanges, etc., to support the lock cylinder 22, thus increasing strength around the lock apparatus 20. The first bracket 56 can be part of the base structure 52 and part of the flange structure 54 of the mirror apparatus 32.

The lock cylinder 22 can include a face 60 (see FIG. 1) visible from outside of the door 18. Simply stated, the face 60 is disposed outside of the passenger compartment 16. The face 60 can face outwardly in the same direction as the outer surface 27 of the door 18. The face 60 defines a key hole to receive the key to mechanically unlock the door 18 from outside of the passenger compartment 16. In certain embodiments, the lock apparatus 20 can optionally include a cover plate 62 (shown in phantom lines in FIG. 1) movable relative to the face 60 to selectively conceal the face 60. In FIG. 1, the cover plate 62 is illustrated spaced from the face 60 such that the key hole is accessible by the key.

Referring to FIG. 2, the mirror apparatus 32 can further include a cover 64 disposed over at least a portion of the first bracket 56 to conceal the first bracket 56 relative to the outer surface 27. At least the portion of the first bracket 56 is disposed between the inner panel 24 and the cover 64. In certain embodiments, the lock cylinder 22 is disposed through the first bracket 56, the cover 64 and the inner panel 24 (see FIG. 2). Therefore, the cover 64 can define a hole 65 that the lock cylinder 22 is disposed through and/or the face of the lock cylinder 22 is visible through. A portion of the cover 64 can be disposed around the mirror apparatus 32 to conceal the electrical wire(s) 42. It is to be appreciated that the cover 64 can be a separate piece from the first bracket 56, or the first bracket 56 and cover 64 can be one piece. The cover 64 can be part of the base structure 52 and part of the flange structure 54 of the mirror apparatus 32.

Figure 3:
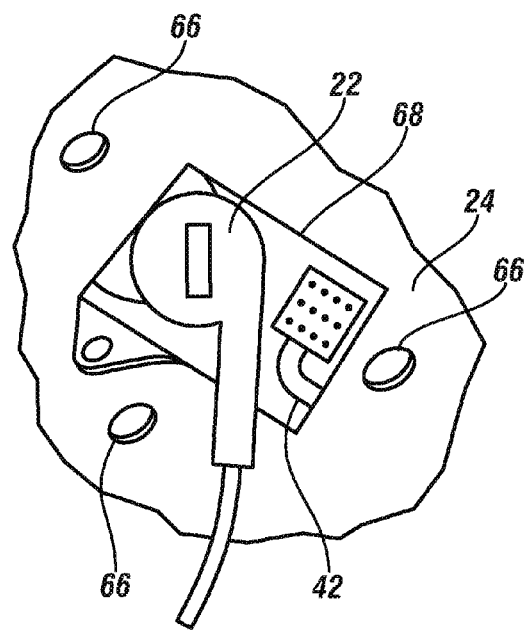
FIG. 3 is a schematic fragmentary perspective view of an inner panel, with the lock cylinder and an electrical wire disposed through the same aperture.

Turning to FIGS. 3 and 4, the inner panel 24 can include at least one mounting point 66, and in certain embodiments, a plurality of mounting points 66 spaced from each other. The mounting points 66 are spaced from the outer panel 26. Therefore, the mirror apparatus 32 is not attached to the outer panel 26, and thus, the outer panel 26 is bypassed. The first bracket 56 can be attached to the mounting points 66 such that the first bracket 56 supports the mirror apparatus 32. In certain embodiments, the first bracket 56 can be directly attached to the mounting points 66. The first bracket 56 can be attached to the inner panel 24 at the mounting points 66 by one or more fasteners, clips, clamps, tabs, etc., and/or friction fit, interference fit, welding, adhesive, etc.

Continuing with FIGS. 3 and 4, the inner panel 24 can define a first aperture 68. Optionally, the mounting points 66 can generally surround the first aperture 68. As discussed above, the electrical wire(s) 42 can be electrically connected to the mirror apparatus 32. Therefore, the electrical wire(s) 42 can be disposed through the first aperture 68. Furthermore, in certain embodiments, the lock cylinder 22 can be disposed through the first aperture 68. As such, in certain embodiments, the lock cylinder 22 and the electrical wire(s) 42 are both disposed through the first aperture 68 (see FIG. 3).

It is to be appreciated that the first aperture 68 can be in other locations than illustrated. For example, the mounting points 66 and the first aperture 68 can be positioned such that the first aperture 68 is not surrounded by the mounting points 66 or is partially surrounded by the mounting points 66. As another example, the first aperture 68 can be disposed closer to one or more mounting points 66 as compared to one or more other mounting points 66.

In certain embodiments, as shown in FIG. 4, the inner panel 24 can also define a second aperture 70 spaced from the first aperture 68. In certain embodiments, the lock cylinder 22 can be disposed through the second aperture 70. Therefore, the lock cylinder 22 can be spaced from the first aperture 68. As such, in FIG. 4, the electrical wire(s) 42 can be disposed through the first aperture 68, and the lock cylinder 22 can be disposed through the second aperture 70. In certain embodiments, the mounting points 66 can generally surround the first and second apertures 68, 70.

It is to be appreciated that the second aperture 70 can be in other locations than illustrated. For example, the mounting points 66 and the second aperture 70 can be positioned such that the second aperture 70 is not surrounded by the mounting points 66 or is partially surrounded by the mounting points 66. As another example, the second aperture 70 can be disposed closer to one or more mounting points 66 as compared to one or more other mounting points 66. As yet another example, the first and second apertures 68, 70 can be disposed closer to each other or farther from each other.

Continuing with FIG. 4, the lock apparatus 20 can optionally include a second bracket 72 separate from the first bracket 56. The second bracket 72 can support the lock cylinder 22. In certain embodiments, the second bracket 72 can be attached to the inner panel 24 at one of the mounting points 66. Alternatively, the lock cylinder 22 can be attached to the inner panel 24 and/or the first bracket 56 by one or more fasteners, clips, clamps, tabs, etc., and/or friction fit, interference fit, welding, adhesive, etc. FIG. 4 illustrates the lock cylinder 22 in solid lines and the optional second bracket 72 in phantom lines which surrounds one of the mounting points 66. FIG. 4 also illustrates another optional location of the lock cylinder 22 and the second bracket 72 in phantom lines relative to the first aperture 68, with the second bracket 72 surrounding another one of the mounting points 66.

Figure 5:
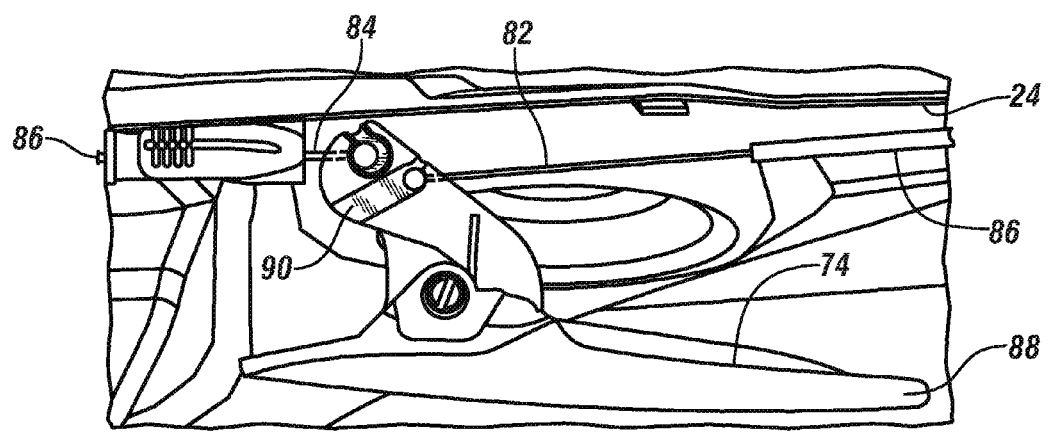
FIG. 5 is a schematic fragmentary side view of the second handle with a first cable and a second cable attached thereto.

Referring to FIGS. 4 and 5, the door assembly 12 can also include a second handle 74 coupled to the inner panel 24 and selectively movable to open the door 18. Simply stated, the second handle 74 is utilized to open the door 18 from inside the passenger compartment 16. The second handle 74 can be disposed closer to the lock apparatus 20 than the first handle 30. More specifically, the lock cylinder 22 can be disposed closer to the second handle 74 than the first handle 30. Therefore, the lock apparatus 20 is spaced a third distance 76 from the second handle 74, with the third distance 76 being less than the second distance 50, and the third distance 76 is greater than the first distance 48. Said differently, the lock apparatus 20 is spaced the third distance 76 from the second handle 74 axially relative to the length of the door 18. The second handle 74 can also be referred to as the inner door handle as discussed above.

Referring back to FIG. 1, the door 18 can include a latch 78 that is movable to allow the door 18 to move to the open position or maintain the door 18 in the closed position.

Generally, the latch 78 can engage a fixed component of the body 14 to secure the door 18 in the closed position, and the latch 78 can be disengaged from the fixed component to allow the door 18 to open.

For the embodiment where the first handle 30, i.e., the outer door handle, is not movable relative to the outer surface 27, under normal operation, the key fob can be utilized to electronically unlock the door 18; and if there is an interruption with the key fob, then the lock apparatus 20 can be utilized to mechanically unlock the door 18. A sensor or switch 79 (illustrated in phantom lines in FIG. 1 for illustrative purposes only) can communicate with the key fob and the latch 78 to unlock the door 18 under normal operation of this embodiment. Therefore, when the key fob is disposed in range of the sensor/switch 79, the sensor/switch 79 (which can be pressed by the passenger desiring to enter the passenger compartment 16) signals the latch 78 (which can be operated by a motor, an actuator, etc.) to disengage from the fixed component to allow the door 18 to be opened. The sensor/switch 79 can be disposed near the first handle 30 or any other suitable location. It is to be appreciated for the embodiment where the first handle 30 is movable relative to the outer surface 27 to open the door 18, the sensor/switch 79 can be removed, i.e., not utilized at all, since the first handle 30 can move to mechanically cause the latch 78 to unlatch the door 18; or alternatively, the sensor/switch 79 can be utilized (with the movable first handle 30) to only electronically unlock the door 18 without allowing the latch 78 to unlatch the door 18, since the latch 78 can be mechanically moved by movement of the first handle 30 to unlatch the door 18.

Continuing with FIG. 1, the lock apparatus 20 can operate to unlock the door 18 by different arrangements. In one arrangement as shown in FIG. 1, the door assembly 12 can include a cable 80 that can be attached to the lock apparatus 20 and the latch 78 of the door 18. The lock cylinder 22 is operated to unlock the door 18 by rotating a portion of the lock cylinder 22 which pulls the cable 80, which in turn causes the latch 78 to unlatch the door 18. In this embodiment, operation of the cable 80 bypasses both of the first and second handles 30, 74. Therefore, the lock apparatus 20 directly operates the latch 78 through the cable 80. As such, the lock apparatus 20 mechanically operates the latch 78 to open the door 18.

In another arrangement as shown in FIG. 1, the door assembly 12 can further include a first cable 82 attached to the lock cylinder 22 and the second handle 74, and additionally can include a second cable 84 attached to the second handle 74 and the latch 78 of the door 18. Movement of the latch 78 can either allow the door 18 to move to the open position (move to unlatch from the fixed component) or maintain the door 18 in the closed position (move to latch to the fixed component). Optionally, a sheath 86 can be disposed over at least a portion of the cable 80, and/or the first and second cables 82, 84.

The lock cylinder 22 can be operated to unlock the door 18 by rotating a portion of the lock cylinder 22 which pulls the first cable 82, which in turn causes the second handle 74 to rotate. Rotation of the second handle 74 pulls the second cable 84, which in turn causes the latch 78 to unlatch the door 18. Therefore, the lock apparatus 20 indirectly operates the latch 78 through the second handle 74. As such, the lock apparatus 20 mechanically operates the latch 78 to open the door 18.

For example, a distal end 88 of the second handle 74 can rotate into the passenger compartment 16 to unlatch the door 18, and a return can return the second handle 74 back to its original position relative to the inner panel 24. The second handle's original position is when the second handle 74 is not opening the door 18. The return for the second handle 74 can be any suitable configuration, and as one non-limiting example, the return can be a spring. The portion of the lock cylinder 22 that rotates to unlock the door 18 can be clockwise or counterclockwise depending on the design of the lock cylinder 22, the location of the lock cylinder 22 and the location of the first cable 82 between the lock cylinder 22 and the second handle 74. It is to be appreciated that the lock cylinder 22 can be any suitable configuration and type to cause the desired movement of the second handle 74. For example, the lock cylinder 22 can be a mechanical lock, such as a pin tumbler, etc., or an electrical lock, such as a magnetic lock, motorized lock, etc.

The first cable 82 can be attached to the lock cylinder 22 by one or more fasteners, clips, clamps, tabs, brackets, ball and groove, cable drum, etc., and/or friction fit, interference fit, welding, adhesive, etc. With regard to the cable drum, a portion of the first cable 82 is wrapped around a drum such that rotation of the portion of the lock cylinder 22 causes rotation of the cable drum to either wrap or unwrap the first cable 82 relative to the drum. A return, on the cable drum and/or the lock apparatus 20, can return the first cable 82 back to its original position. The return for the cable drum and/or the lock apparatus 20 can be any suitable configuration, and as one non-limiting example, the return can be a spring. The first cable's original position is when the first cable 82 is not being pulled to open the door 18.

Operation of the first and second cables 82, 84 bypasses the first handle 30. Therefore, operation of the lock cylinder 22 bypasses the first handle 30, i.e., the outer door handle. As such, the lock apparatus 20 operates independently of the first handle 30. Hence, operating the lock apparatus 20 does not operate of the first handle 30.

Furthermore, when a passenger desires to open the door 18 from inside the passenger compartment 16, the first cable 82 does not operate the lock cylinder 22. Therefore, when the second handle 74 is rotated to open the door 18 from inside the passenger compartment 16, the latch 78 operates through the second cable 84. The second handle 74 defines a recess 90 that an end of the first cable 82 can move into as the second handle 74 rotates to open the door 18 from inside the passenger compartment 16 to prevent the first cable 82 from pulling to actuate the lock cylinder 22.

As discussed above, optionally, the mirror apparatus 32 can be movable. For example, the mirror 34 can be rotatable between an extended position in which the mirror 34 is disposed transverse to the outer panel 26 (see FIG. 1) and a retracted position in which the mirror 34 faces the lock cylinder 22 such that the mirror 34 covers the lock cylinder 22 (see FIG. 2). Generally, a portion of the cover 64 with the mirror apparatus 32 can move between the extended and retracted positions. Therefore, for example, the portion of the cover 64 which is behind the mirror 34, can be rotated to the retracted position such that the mirror 34 is disposed between the lock cylinder 22 and the back of the cover 64. It is to be appreciated that the first bracket 56 and/or the cover 64 can cooperate to conceal the internal components of the mirror apparatus 32. For example, the first bracket 56 and/or the cover 64 can cooperate to conceal the motor 38, the heating element 36, the electrical wire(s) 42, etc.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A door assembly comprising:
an inner panel and an outer panel coupled to each other to define a door having an outer surface visible from outside of the door, and wherein the door includes a latch;
a first handle attached to the outer panel and visible from outside of the door;
a mirror apparatus supported by the door and extending outwardly away from the inner panel such that the mirror apparatus is disposed outside of the door, and with the mirror apparatus spaced apart from the first handle; and
a lock apparatus supported by at least one of the door and the mirror apparatus, and wherein the lock apparatus is disposed closer to the mirror apparatus than the first handle;
wherein the mirror apparatus includes a mirror, and one or more of a heating element that is electrically connected to the mirror to heat the mirror, a motor coupled to the mirror to move the mirror and a visual indicator;
an electrical wire electrically connected to one or more of the heating element, the motor and the visual indicator;
a cable spaced from the electrical wire and attached to the lock apparatus, and wherein the cable is coupled to the latch of the door.

2. The assembly as set forth in claim 1 wherein the mirror apparatus includes a first bracket mounted to the inner panel such that the first bracket is supported by the door, and the mirror is supported by the first bracket, and wherein the lock apparatus includes a lock cylinder disposed through the first bracket, and the lock cylinder is disposed closer to the mirror than the first handle.

3. The assembly as set forth in claim 2 wherein the first bracket defines an opening and the lock cylinder is disposed through the opening, and wherein the lock cylinder includes a face visible from outside of the door.

4. The assembly as set forth in claim 3 wherein the lock apparatus includes a cover plate movable relative to the face to selectively conceal the face.

5. The assembly as set forth in claim 2 wherein the mirror apparatus further includes a cover disposed over at least a portion of the first bracket to conceal the first bracket relative to the outer surface, and wherein the lock cylinder is disposed through the first bracket, the cover and the inner panel.

6. The assembly as set forth in claim 2 wherein the inner panel includes a plurality of mounting points spaced from each other, with the first bracket directly attached to the mounting points.

7. The assembly as set forth in claim 6 wherein the lock apparatus includes a second bracket separate from the first bracket and attached to the inner panel at one of the mounting points, with the second bracket supporting the lock cylinder.

8. The assembly as set forth in claim 1 wherein the inner panel defines a first aperture, with the electrical wire electrically connected to the mirror apparatus, and wherein the lock apparatus includes a lock cylinder, with the lock cylinder and the electrical wire both disposed through the first aperture.

9. The assembly as set forth in claim 1 wherein the inner panel defines a first aperture, with the electrical wire disposed through the first aperture and electrically connected to the mirror apparatus, and wherein the inner panel defines a second aperture spaced from the first aperture, and wherein the lock apparatus includes a lock cylinder disposed through the second aperture.

10. The assembly as set forth in claim 1 wherein the cable is attached to the latch of the door, and wherein the lock cylinder is operated to unlock the door by rotating a portion of the lock cylinder which pulls the cable which in turn causes the latch to unlatch the door.

11. The assembly as set forth in claim 10 further including a second handle coupled to the inner panel and selectively movable to open the door, and wherein operation of the cable bypasses both of the first and second handles.

12. The assembly as set forth in claim 1 further including a second handle coupled to the inner panel and selectively movable to open the door, with the second handle disposed closer to the lock apparatus than the first handle.

13. The assembly as set forth in claim 12:
wherein the lock apparatus includes a lock cylinder disposed closer to the second handle than the first handle;
wherein the cable is further defined as a first cable, and the first cable is attached to the lock cylinder and the second handle;
a second cable attached to the second handle and the latch, with the first and second cables each directly attached to the second handle in different locations;
wherein the lock cylinder is operated to unlock the door by rotating a portion of the lock cylinder which pulls the first cable which in turn causes the second handle to rotate, and rotation of the second handle pulls the second cable which in turn causes the latch to unlatch the door;
wherein operation of the first and second cables bypasses the first handle; and
wherein the second handle defines a recess, and wherein an end of the first cable is movable into the recess to open the door via the second handle without actuating the lock cylinder.

14. The assembly as set forth in claim 1 wherein the lock apparatus includes a lock cylinder disposed closer to the mirror apparatus than the first handle, wherein the mirror apparatus includes a cover partially surrounding the mirror, and wherein a portion of the cover and the mirror are rotatable relative to the door between an extended position in which the portion of the cover and the mirror are disposed transverse to the outer panel and a retracted position in which the portion of the cover and the mirror face the lock cylinder such that the portion of the cover and the mirror cover the lock cylinder.

15. A vehicle comprising:
a body defining a passenger compartment;
an inner panel and an outer panel coupled to each other to define a door, with the door movable between an open position and a closed position relative to the passenger compartment, and wherein the door includes a latch to selectively unlatch the door;

wherein the inner panel includes an inner surface and an outer surface opposing the inner surface of the inner panel;

wherein the outer panel includes an inner surface and an outer surface opposing the inner surface of the outer panel;

wherein the inner panel is disposed closer to the passenger compartment than the outer panel;

a first handle attached to the outer panel and exposed outside of the passenger compartment;

a mirror apparatus supported by the door and disposed outside of the passenger compartment, with the mirror apparatus spaced apart from the first handle; and a lock apparatus supported by at least one of the door and the mirror apparatus, and wherein the lock apparatus is disposed closer to the mirror apparatus than the first handle;

wherein the mirror apparatus includes a mirror, and one or more of a heating element that is electrically connected to the mirror to heat the mirror, a motor coupled to the mirror to move the mirror and a visual indicator;

an electrical wire electrically connected to one or more of the heating element, the motor and the visual indicator;

a cable spaced from the electrical wire and attached to the lock apparatus, and wherein the cable is coupled to the latch of the door;

wherein the electrical wire and the cable are operable independently of each other.

16. The vehicle as set forth in claim 15 further including a second handle coupled to the inner panel and selectively movable to open the door from inside the passenger compartment, and the second handle is disposed closer to the lock apparatus than the first handle.

17. The vehicle as set forth in claim 16 wherein the lock apparatus includes a lock cylinder disposed closer to the second handle than the first handle, wherein the cable is further defined as a first cable, and the first cable is attached to the lock cylinder and the second handle, and a second cable attached to the second handle and the latch of the door, and wherein the lock cylinder is operated to unlock the door by rotating a portion of the lock cylinder which pulls the first cable which in turn causes the second handle to rotate, and rotation of the second handle pulls the second cable which in turn causes the latch to unlatch the door.

18. The vehicle as set forth in claim 15 wherein the electrical wire is electrically connected to the mirror apparatus and the inner panel defines a first aperture, and wherein the lock apparatus includes a lock cylinder, and the lock cylinder and the electrical wire are both disposed through the first aperture.

19. The vehicle as set forth in claim 15 wherein the electrical wire is electrically connected to the mirror apparatus and the inner panel defines a first aperture, and the electrical wire is disposed through the first aperture, and wherein the inner panel defines a second aperture spaced from the first aperture, and wherein the lock apparatus includes a lock cylinder disposed through the second aperture.

20. A door assembly comprising:

an inner panel and an outer panel coupled to each other to define a door having an outer surface visible from outside of the door, and wherein the door includes a latch;

wherein the inner panel includes an inner surface and an outer surface opposing the inner surface of the inner panel;

wherein the outer panel includes an inner surface and an outer surface opposing the inner surface of the outer panel;

a first handle attached to the outer panel and visible from outside of the door;

wherein the outer panel is disposed closer to the first handle than the inner panel;

a mirror apparatus supported by the door and extending outwardly away from the inner panel such that the mirror apparatus is disposed outside of the door, and with the mirror apparatus spaced apart from the first handle; and a lock apparatus supported by at least one of the door and the mirror apparatus, and wherein the lock apparatus is disposed closer to the mirror apparatus than the first handle;

wherein the mirror apparatus includes a mirror, and one or more of a heating element that is electrically connected to the mirror to heat the mirror, a motor coupled to the mirror to move the mirror and a visual indicator;

an electrical wire electrically connected to one or more of the heating element, the motor and the visual indicator;

a cable spaced from the electrical wire and attached to the lock apparatus, and wherein the cable is coupled to the latch of the door;

wherein:
the lock apparatus includes a lock cylinder disposed closer to the mirror apparatus than the first handle;
the mirror apparatus includes a cover partially surrounding the mirror, and the cover defines a hole that the lock cylinder is disposed through;
a portion of the cover and the mirror are rotatable relative to the door between an extended position in which the portion of the cover and the mirror are disposed transverse to the outer panel and a retracted position in which the portion of the cover and the mirror face the lock cylinder such that the portion of the cover and the mirror cover the lock cylinder;
the mirror apparatus includes a bracket mounted to the inner panel such that the bracket is supported by the door, and the mirror is supported by the bracket;
the bracket defines an opening, with the lock cylinder disposed through the opening;
the lock cylinder is disposed through the inner and outer surfaces of the inner panel.

* * * * *